United States Patent [19]

Ishimura et al.

[11] Patent Number: 5,032,238
[45] Date of Patent: Jul. 16, 1991

[54] METHOD OF AND APPARATUS FOR ELECTROPOLISHING AND GRINDING

[75] Inventors: Kazuhiko Ishimura; Ikuo Nagasawa; Shigeru Muramoto; Naohiro Hotta, all of Yokohama, Japan

[73] Assignee: Asahi Glass Co., Ltd., Tokyo, Japan

[21] Appl. No.: 590,131

[22] Filed: Sep. 28, 1990

[30] Foreign Application Priority Data

Oct. 4, 1989 [JP] Japan .................................. 1-259402

[51] Int. Cl.⁵ .......................... C25F 3/16; C25F 3/24; C25F 7/00
[52] U.S. Cl. .................... 204/129.43; 204/129.46; 204/217; 204/224 M; 204/DIG. 9
[58] Field of Search .............. 204/129.46, 217, 224 M, 204/129.43, DIG. 9

[56] References Cited

U.S. PATENT DOCUMENTS

| | | | |
|---|---|---|---|
| 3,293,162 | 12/1966 | Sullivan | 204/129.46 X |
| 4,849,599 | 7/1989 | Kuromatsu | 219/69.17 |

FOREIGN PATENT DOCUMENTS

| | | | |
|---|---|---|---|
| 7000964 | 10/1966 | Japan | 204/129.46 |
| 0270025 | 11/1985 | Japan | 204/129.46 |
| 0270024 | 11/1986 | Japan | 204/129.46 |
| 1-188266 | 7/1989 | Japan | . |
| 0808230 | 3/1981 | U.S.S.R. | 204/129.46 |
| 2186823 | 7/1987 | United Kingdom | . |

*Primary Examiner*—Donald R. Valentine
*Attorney, Agent, or Firm*—Oblon, Spivak, McClelland, Maier & Neustadt

[57] ABSTRACT

A method of electropolishing and grinding the both surfaces of a circular workpiece comprises polishing and grinding the both surfaces of a circular workpiece with a pair of grindingstones which are so arranged as to oppose the polishing/grinding surfaces, the body material of the polishing/grinding surface of the grindingstones being composed of an electric conductive material wherein the grindingstones are connected to the positive pole of a power source and an electrode located in the vicinity of the grindingstones is connected to the negative pole, and a voltage is applied across the positive and negative poles, whereby a dressing operation to the polishing/grinding surfaces is conducted by the electrolysis of the pair of grindingstones during the polishing and grinding operation.

10 Claims, 5 Drawing Sheets

FIGURE 2
FIGURE 3
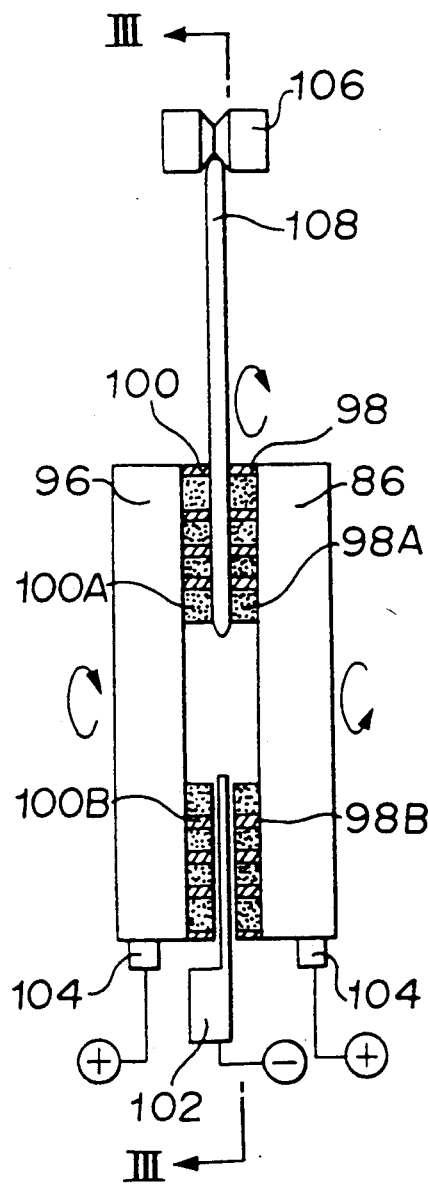
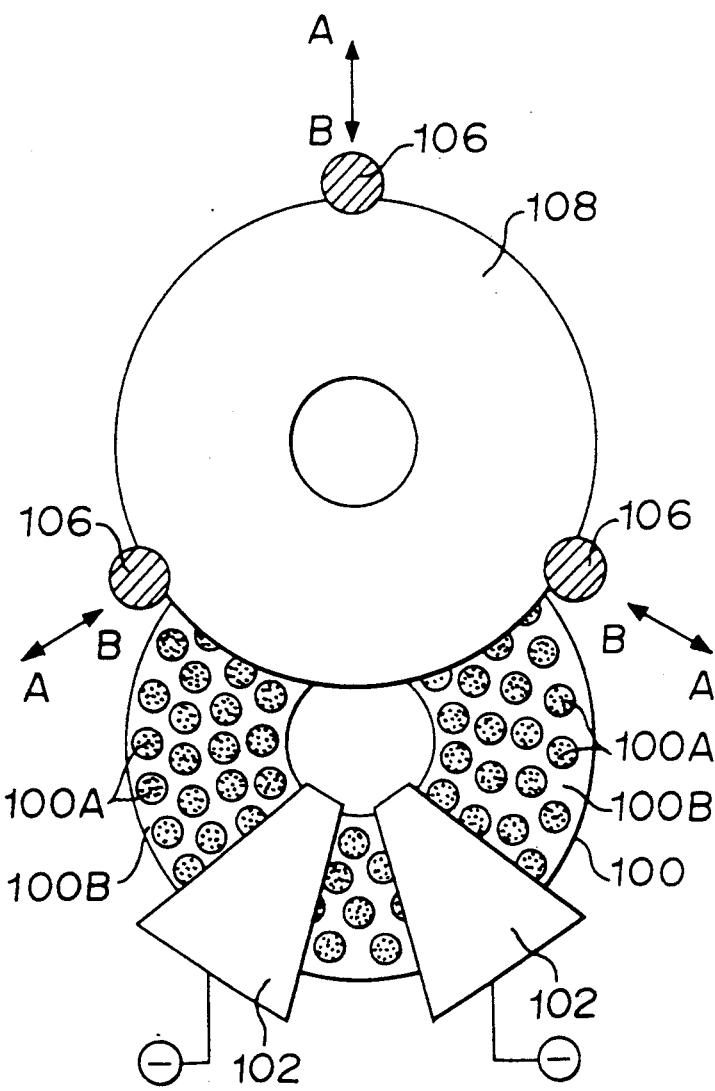

METHOD OF AND APPARATUS FOR ELECTROPOLISHING AND GRINDING

The present invention relates to a method of and an apparatus for electropolishing and grinding wherein a plate-like material is polished and ground with a grindingstone having a polishing/grinding surface which includes a body material formed of an electric conductive material and the polishing/grinding surface of the grindingstone is electrochemically dressed during a polishing and grinding operation.

Heretofore, the polishing of a circular disk of glass or the like used for a magnetic disk or an optical magnetic disk has been carried out in a way as shown in FIG. 5. Namely, a circular disk 14 as a workpiece to be processed is put between a table 10 and a grinding plate 12 and the circular disk is polished by rotating the grinding plate 12 under the condition that a predetermined pressure is applied thereto while slurry 16 including abrasive grain is supplied between the circular disk 14 and the grinding plate 12.

The conventional polishing method is poor in productivity since only one side surface 14A of the circular disk 14 is polished. Accordingly, a polishing apparatus wherein both surfaces of the circular disk 14 are simultaneously polished is proposed in order to improve production efficiency. The polishing apparatus comprises a ring gear wheel 20, carriers 22 and a sun gear wheel 24 as shown in FIGS. 6 and 7, and each circular disk 14 is put in a circular opening 22B formed in each of the carriers 22. Since the circular disks 14 are formed to have a larger thickness than the thickness L2 of the carriers 22 as shown in FIG. 7, the both surfaces of the circular plates 14 project from the both surfaces of the carriers 22. Under the conditions, the circular plates 14, 14 ... are clamped between a lower grinding plate 28 and an upper grinding plate 30 and the grinding plates 28, 30 are rotated. At the same time, the ring gear wheel or the sun gear wheel 24 is rotated. Then, the carriers 22 are rotated in the directions of arrow marks A and are revolved in the directions of arrow marks B as shown in FIG. 6. During the above-mentioned operations, the slurry containing abrasive grain is supplied onto the surface of the circular plate 14 to be processed, whereby the both surfaces of the circular plates 14, 14 ... are polished with the abrasive grain.

However, for the purpose of obtaining mirror surfaces having high transparency, the above-mentioned method wherein the circular plates are polished with the abrasive grain supplied from the outside (i.e. the polishing method with use of free abrasive grain) is inefficient.

On the other hand, there has been proposed a method of obtaining a finely finished surface having high transparency without using free abrasive grain (in a paper in The autumn session of the precision engineering academy held in 1988). According to the paper, the body material of the grinding surface of a grindingstone is formed of an electric conductive material and the grinding surface of the grindingstone is electrochemically dressed during the grinding of a plate-like material, whereby a danger of the clogging of the grindingstone can be eliminated and a flat, mirror-like finished surface is easily obtainable with high efficiency and high precision as well as high transparency.

According to the above-mentioned method, a circular plate 38 placed on a table 36 is ground by a grindingstone 42 attached onto a rotating plate 40 as shown in FIG. 8. For the grinding surface of the grindingstone 42, cast iron is used as a body material. Abrasive grain of diamond 42A, 42A ... are embedded in the body material of the grindingstone 42. The positive pole of a power source 44 is connected to the grindingstone 42 and the negative pole of the power source 44 is connected to a copper plate 46 which is disposed so as to oppose the grinding surface of the grindingstone 42.

In the grinding apparatus having the construction described above, when the circular plate 38 is ground by the grindingstone 42 and a positive voltage having a rectangular waveform (a pulsating voltage) is applied to the grindingstone 42, the cast iron as the body material of the grindingstone 42 is dissolved and the dissolved cast iron flows toward the copper plate 46, whereby the grinding surface of the grindingstone 42 is electrochemically dressed. Accordingly, there is no danger that shaved powder from the circular plate 30 deposits on the grinding surface of the grindingstone 42 to thereby cause clogging, and any trace of seizure is not resulted on the grinding surface of the circular plate. As a result, the circular plate 38 can be easily finished to have a mirror surface having high transparency. In the conventional electropolishing and grinding apparatus as shown in FIG. 8, however, there is a problem of low production efficiency because only a single surface of the circular plate 38 is ground.

It is an object of the present invention to provide a method of and apparatus for electropolishing and grinding which can produce easily a plate-like material having precisely finished surfaces to thereby improve productivity.

In accordance with the present invention, there is provided a method of electropolishing and grinding the both surfaces of a circular workpiece which comprises polishing and grinding the both surfaces of a circular workpiece with a pair of grindingstones which are so arranged as to oppose the polishing/grinding surfaces, the body material of the polishing/grinding surface of the grindingstones being composed of an electric conductive material wherein the grindingstones are connected to the positive pole of a power source and an electrode located in the vicinity of the grindingstones is connected to the negative pole, and a voltage is applied across the positive and negative poles, whereby a dressing operation to the polishing/grinding surfaces is conducted by the electrolysis between the grindingstones the electrodes during the polishing and grinding operation.

In accordance with the present invention, the both surfaces of a plate-like material are held from the both sides by the pair of grindingstones each being composed of an electric conductive material as a body material, and the grindingstones are rotated. The grindingstones are connected to a positive terminal of a power source and an electrode disposed near the grindingstone is connected to the negative terminal. By applying a voltage between the positive and negative terminals, the body material of the grindingstones is dissolved so that electrolysis dressing operations is carried out during polishing and grinding operation. In this case, the abrasive grain entirely embedded in the body material is successively exposed on the surface of the grindingstones, whereby new, fine cutting blade portions project from the polishing/grinding surface of the grindingstones. Accordingly, there is no danger of the clogging of the surfaces due to polished and ground powder. Further, productivity is improved because the both surfaces of the plate-like material are simultaneously polished and ground.

In drawings:

FIG. 2 is a schematic view showing an important portion of the electropolishing and grinding apparatus of the present invention;

FIG. 3 is a cross-sectional view taken along a line III—III in FIG. 2;

Preferred embodiments of a method of and apparatus for electropolishing and grinding according to the present invention will be described with reference to the drawings.

Figure 1:
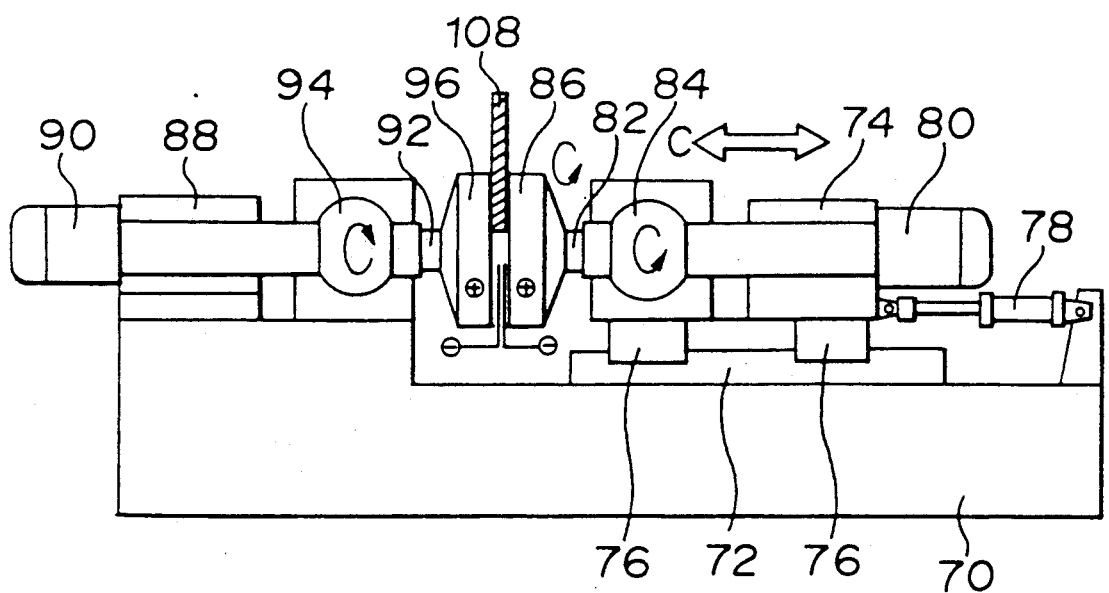
FIG. 1 is a front view schematically illustrated of an embodiment of the electropolishing and grinding apparatus according to the present invention.

FIG. 1 schematically shows an embodiment of the electropolishing and grinding apparatus of the present invention. In FIG. 1, guide rails 72 are mounted on the upper surface of a frame 70 in its longitudinal direction, and a sliding unit 74 is slidably supported by the guide rails 72 through guide members 76, 76. The sliding unit 74 is moved along the guide rails by actuating an oil cylinder 78. A motor 80 is mounted on the sliding unit 74 and a shaft 72 is connected to the driving shaft of the motor 80. The shaft 82 is supported by a superfine air bearing or a fine bearing 84, and a rotating plate 86 is attached to an end (the left side in FIG. 1) of the shaft 82 as shown in FIG. 1.

A motor 90 is mounted on a supporter 88 which is fixed to the frame 70, and a shaft 92 is connected to the driving shaft of the motor 90. The shaft 92 is supported by a superfine air bearing or a fine bearing 94, and a rotating plate 96 is attached to an end (the right side in FIG. 1) of the shaft 92 as shown in FIG. 1.

Figure 4:
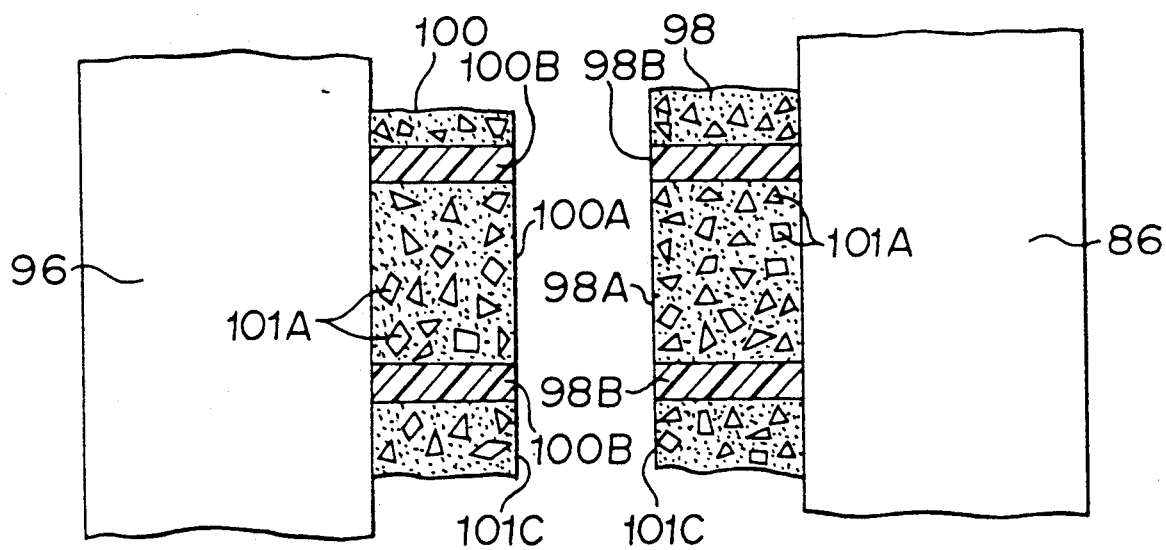
FIG. 4 is an enlarged view showing an important portion of the electropolishing and grinding apparatus of the present invention.
Figure 5:
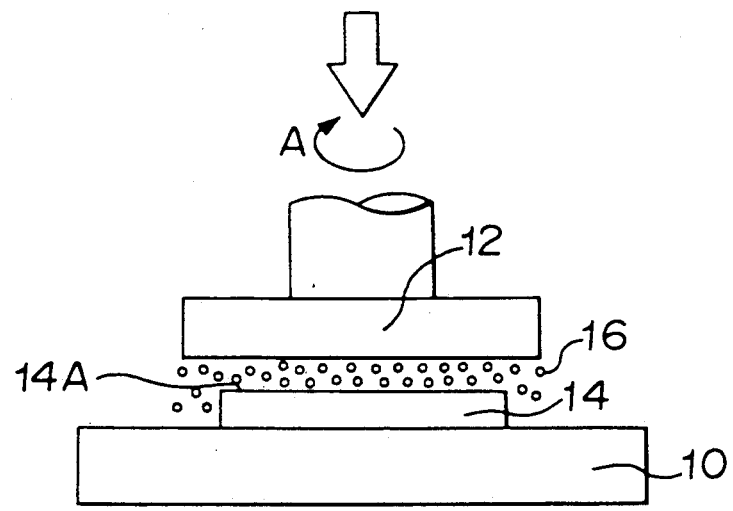
FIG. 5 is a diagram for explaining a conventional polishing device.
Figure 6:
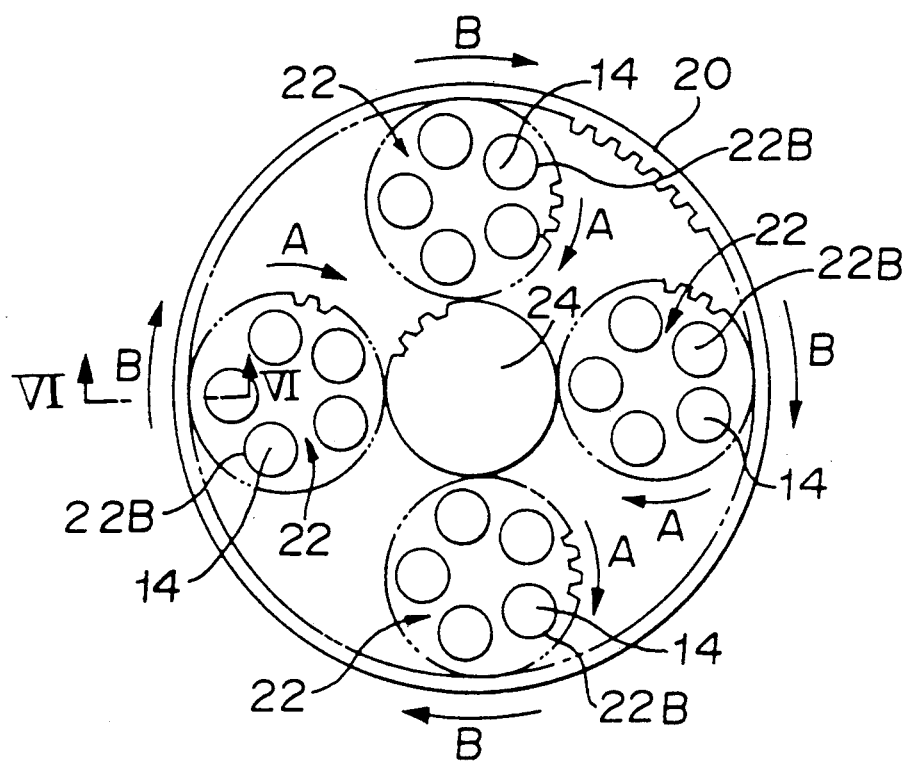
FIG. 6 is a plane view of a conventional polishing device to polish both surfaces of circular plates.
Figure 7:
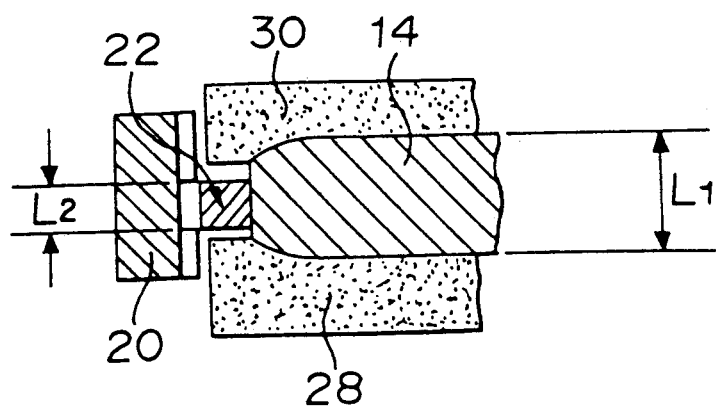
FIG. 7 is an enlarged cross-sectional view taken along a line VI—VI, in FIG. 6.
Figure 8:
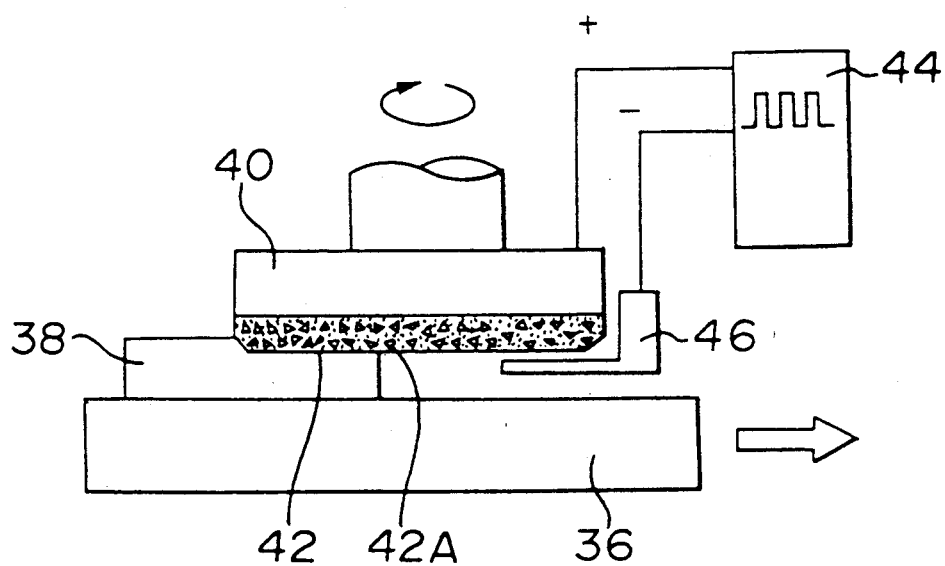
FIG. 8 is a diagram showing a conventional electroplating the grinding apparatus.

Grindingstones 98, 100 are respectively attached to the opposing surfaces of the rotating plates 86, 96 as shown in FIG. 2. As shown in FIGS. 1 and 2, the grindingstones 98, 100 respectively have grindingstone forming units 98A, 98A ... and grindingstone forming units 100A, 100A ..., each made of cast iron wherein the units 98A, 98A ... and the units 100A, 100A ... are respectively attached to the rotating plates 86, 96 by filling with resin gaps between adjacent grindingstone forming units as well as covering with resin the outer circumference thereof. The grinding forming units 98, 100 which constitute the polishing/grinding surface of the grindingstone is constituted by an electric conductive material as a bonding material or a body material wherein fine particles of a material such as diamond 101A, 101A ... are embedded in the body material as shown in FIG. 4. For the body material, cast iron, cast iron fibers or the like is used, for example. In particular, when the cast iron fibers are used for the body material, it is possible to increase a holding strength for holding fine particles of diamond and the strength of the grindingstone itself. Further, flexibility is given to the grindingstone because of a fiber matrix structure. Further, since the holding strength for holding the abrasive grain is extremely increased, grinding operation by fine abrasive grain, which could not be realized in the conventional method, becomes possible, whereby polishing and grinding with high accuracy and mirror finishing can be realized and problems such as wheel friction and seizure during grinding operations can be minimized. For the grindingstone forming units described above, a circular disk-like units, polygonal plate-like units, pellet-like units or another units having various types of shape can be used.

As shown in FIGS. 2 and 3, sectorial copper plates 102, 102 are disposed between the grindingstones 98, 100. The reason why the sectorial copper plates 102 are used is to make the electrode density uniform. In other words, if the central area and the outer circumferential area of the grindingstone are electrolyzed uniformly, the thickness of the grindingstone becomes ununiform, and uniform polishing and grinding can not be achieved. A fine space is formed between the copper plates 102, 102 and the grindingstone 98, and between the copper plates 102, 102 and the grindingstone 100. An insulating coating is applied to an area of the copper plate which is not oppose to the grindingstone, that is, an area where the copper plate 102 is not used. The negative pole of a power source (not shown) is connected to the copper plates 102, 102. The positive pole of the power source is connected to the rotating plates 86, 96 through brushes 104, 104 respectively.

As shown in FIGS. 2 and 3, the electropolishing and grinding apparatus of the present invention is provided with workpiece holding rollers 106, 106, 106. The workpiece holding rollers are respectively rotatable on their axis and are supported to be movable in the directions of arrow marks A-B in FIG. 3. Accordingly, a circular disk-like glass plate 108 can be located at a predetermined position after the workpiece holding rollers 106 have been respectively moved in the directions of arrow marks A, and then, the workpiece holding rollers 106 are respectively moved in the directions of arrow marks B so that the glass plate 108 can be rotatably supported.

The function of the electroplating and grinding apparatus of the present invention constructed described above will be explained.

The workpiece holding rollers 106 are respectively moved in the directions of the arrow marks A in FIG. 3. A circular glass plate 108 which is not yet processed is disposed at a predetermined position. Then, the workpiece holding rollers 106 are respectively moved in the directions of the arrow marks B in FIG. 3 so that the glass plate 108 is rotatably supported. The cylinder 78 is actuated to move the sliding unit 74 in the direction of the arrow mark C in FIG. 1, whereby the rotating plate 86 is moved in the direction of the arrow mark C together with the sliding unit 74, and the glass plate 108 is held between the grindingstone 98 of the rotating plate 86 and the grindingstone 100 of the rotating plate 96.

The motor 80 and the motor 90 are respectively driven so that the rotating plate 86 and the rotating plate 96 are respectively rotated in the directions opposite to each other, whereby the grindingstone 98 and the grindingstone 100 which hold the glass plate 108 therebetween are rotated in mutually opposite directions. In this case, when the rotating speed of the grindingstone 98 is different from the rotating speed of the grindingstone 100, the glass plate 108 is rotated so that the glass plate 108 is subjected to polishing-grinding by the grindingstones 98, 100. When the polishing/grinding operation is to be carried out, a polishing/grinding solution containing water, e.g. slurry containing a polishing/grinding agent or water is supplied between the glass plate 108 and the grindingstones 98, 100. Such liquid also functions as an electrolyte for electrolysis.

On the other hand, a pulsating voltage having a rectangular waveform is applied from the positive pole side of the electrode to the grindingstones 98, 100 through the brushes 104, 104, whereby electrolysis is resulted between the grindingstones 98, 100, and the copper plates 102 which are in contact with the electrolyte. Then, the body material formed of an electric conductive material such as cast iron is dissolved from the grindingstone forming units 98A, 98A ... which constitute the grindingstone 98 and the grindingstone forming units 100A, 100A which constitute the grindingstone 100; thus, electrolysis-dressing operation is achieved. In this case, shaved glass powder deposited on the surfaces 101C of the grindingstones 98, 100 flows along with dissolved cast iron toward the copper plates 102, 102 connected to the negative pole. Thus, the glass powder is removed from the grindstone side. However, a certain portion of the cast iron is deposited on the copper plates 102, 102. The cast iron and the glass powder are removed by supplying coolant or the polishing/grinding solution or water which is fed between the grindingstones 98, 100 from the outside, and they are discharged with such liquid. The reason why the pulsating voltage is applied is that the cast iron and/or glass powder deposited on the copper plates 102, 102 can be easily removed with the liquid such as coolant. Accordingly, in accordance with the electropolishing and grinding apparatus of the present invention, the polishing/grinding surfaces of the grindingstones 98, 100 can be electrochemically dressed during the polishing and grinding operation of the both surfaces of the glass plate 108. Therefore, there is little possibility that clogging is resulted in the grindingstones 98, 100 during the polishing and grinding operation of the glass plate 108.

In the electropolishing and grinding apparatus of the present invention, use of the workpiece holding rollers 106 allow the polishing and grinding of the glass plate 108 in a freely rotatable manner. Accordingly, the flatness of the glass plate 108 is improved.

In the above-mentioned embodiment, grindingstones having different roughness of 3-5 grades may be used. For instance, grindingstones are replaced depending on steps of grinding, lapping and polishing so that grindingstones are used from relatively rough grinding to finely polishing stepwisely. Thus, the quality of processing is improved and a high speed polishing and grinding operations can be obtained.

In the above-mentioned embodiment, two copper plates 102 are arranged between the grindingstones 98, 100. However, more than two copper plates may be used. Further, the copper plates 2 is used for a negative pole. However, a suitable electric conductive material other than the copper plates may be used. Further, the cast iron is used for the body material of the grindingstone. However, a suitable body material of an electric conductive material other than cast iron may be used.

In the above-mentioned embodiment, a glass plate is used for a workpiece to be processed. However, the present invention is not limited thereto, and the present invention is applicable to fine polishing and grinding a hard fragile material such as ceramics, silicon or the like or an Al plate, a metallic plate, a plastic plate or the like.

Thus, in accordance with the method of and and apparatus for electropolishing and grinding according to the present invention, both surfaces of a plate-like material can be simultaneously polished and ground by a pair of grindingstones, and shaved powder can be removed from the grindingstones by dissolving the polishing/grinding surface of the grindingstones. Accordingly, there are little possibility of decreasing of grinding performance with a lapse of time due to the clogging of the grindingstones and seizure on the grindingstones. Further, shaving powder can be removed during the polishing and grinding operations. Therefore, productivity can be improved, and plate-like materials having highly accurate finished surfaces can be easily obtained.

We claim:

1. A method of electropolishing and grinding the both surfaces of a circular workpiece which comprises polishing and grinding the both surfaces of a circular workpiece with a pair of grindingstones which are so arranged as to oppose the polishing/grinding surfaces, the body material of the polishing/grinding surface of the grindingstones being composed of an electric conductive material wherein the grindingstones are connected to the positive pole of a power source and an electrode located in the vicinity of the grindingstones is connected to the negative pole, and a voltage is applied across the positive and negative poles, whereby a dressing operation to the polishing/grinding surfaces is conducted by the electrolysis between the grindingstones and the electrode during the polishing and grinding operation.

2. The method of electropolishing and grinding according to claim 1, wherein the polishing and grinding operation is simultaneously conducted to the both surfaces of the circular workpiece with the pair of grindingstones which are so arranged as to oppose the polishing/grinding surfaces, the body material of the polishing/grinding surface of the grindingstones being composed of an electric conductive material wherein the grindingstones are connected to the positive pole of a power source and an electrode located in the vicinity of the grindingstones is connected to the negative pole so that and a voltage is applied across the positive and negative poles, whereby a dressing operation to the polishing/grinding surfaces is simultaneously conducted by the electrolysis between the grindingstones and the electrode during the polishing and grinding operation.

3. The method of electropolishing and grinding according to claim 1, wherein an electrode is disposed between the pair of grindingstones so that the pair of grindingstones are used as positive poles and the electrode is used as a negative pole, and a voltage is applied across the positive and negative poles, whereby an dressing operation to both opposing polishing/grinding surfaces of the pair of grindingstones is simultaneously conducted by the electrolysis of the polishing/grinding surfaces during the polishing and grinding operation.

4. The method of electropolishing and grinding according to claim 1, wherein a voltage in a pulse form is applied across the positive and negative poles so that a dressing operation to the polishing/grinding surfaces of the grindingstones is conducted by the electrolysis of the surfaces during the polishing and grinding operation.

5. An electropolishing and grinding apparatus which comprises
- a pair of grindingstones to support a workpiece to be processed between them and to polish and grind the both surfaces of the workpiece, the body material of the polishing/grinding surface of the grindingstones being composed of an electric conductive material,
- an electrode located in the vicinity of the polishing/grinding surface of each of the grindingstones,
- a holding means to hold the workpiece between the pair of the grindingstones, and
- a power source to apply a voltage between the positive pole which is connected to the grindingstones and the negative pole which is connected to the electrode, whereby electrolysis-dressing operation is conducted to the polishing/grinding surfaces by the electrolysis of the surfaces which oppose the electrode.

6. The electropolishing and grinding apparatus according to claim 5, wherein the polishing/grinding surface of each of the grindingstones is constituted by a plurality of units in which cast iron is used for the body material, and spaces between the adjacent units are filled with resin and abrasive grains.

7. The electropolishing and grinding apparatus according to claim 5, wherein an electrode as a negative pole is disposed between the pair of grindingstones and in the vicinity of the polishing/grinding surface of the grindingstones.

8. The electropolishing and grinding apparatus according to claim 5, wherein the grindingstones have a circular shape, and the electrode disposed as a negative pole between the pair of grindingstones and in the vicinity of the polishing/grinding surface of the grindingstones has a sectorial shape.

9. The electropolishing and grinding apparatus according to claim 5, wherein the pair of grindingstones disposed opposing to each other have a circular shape; the workpiece to be processed is positioned so that it is polished and ground at one side of each of the pair of grindingstones, and an electrode is arranged as a negative pole at the other side of each of the pair of grindingstones so that the opposing polishing/grinding surfaces of the pair of grindingstones are simultaneously dressed by the electrolysis of the polishing/grinding surfaces.

10. The electropolishing and grinding apparatus according to claim 5, wherein the workpiece to be processed has a circular disk shape, and a plurality of holding rollers are provided to hold the circular-disk shaped workpiece.

* * * * *